United States Patent [19]  
Hatanaka et al.

[11] Patent Number: 4,764,547  
[45] Date of Patent: Aug. 16, 1988

[54] RUBBER COMPOSITION COMPRISING SURFACE-TREATED CARBON BLACK

[75] Inventors: Takashi Hatanaka; Michitaka Takeshita, both of Tokyo, Japan

[73] Assignee: Bridgestone Corporation, Tokyo, Japan

[21] Appl. No.: 29,102

[22] Filed: Mar. 23, 1987

[30] Foreign Application Priority Data

Apr. 23, 1986 [JP] Japan .................................. 61-92360

[51] Int. Cl.$^4$ .............................................. C08K 9/04
[52] U.S. Cl. ................................... 523/215; 523/202; 524/87; 524/254; 524/255; 524/257; 524/258; 524/496
[58] Field of Search ................... 523/202, 215; 524/87, 524/254, 255, 257, 258, 496

[56] References Cited

U.S. PATENT DOCUMENTS

| | | | |
|---|---|---|---|
| 2,867,540 | 1/1959 | Harris | 523/215 |
| 2,955,097 | 10/1960 | White | 523/215 |
| 3,196,127 | 7/1965 | Kraus | 523/215 |
| 3,499,865 | 3/1970 | Neuried | 523/215 |
| 4,631,304 | 12/1986 | Wilder | 523/215 |

FOREIGN PATENT DOCUMENTS

| | | | |
|---|---|---|---|
| 24436 | 3/1981 | Japan | 523/215 |
| 84/02140 | 6/1984 | PCT Int'l Appl. | 523/215 |
| 1068445 | 1/1984 | U.S.S.R. | 523/215 |

Primary Examiner—John C. Bleutge  
Assistant Examiner—David W. Woodward  
Attorney, Agent, or Firm—Sughrue, Mion, Zinn, Macpeak, and Seas

[57] ABSTRACT

A rubber composition comprising 30–140 parts by weight of carbon black treated with a particular compound based on 100 parts by weight of rubber which provides an improved reinforcement property of the rubber composition and at the same time improvement of the efficiency of productivity in tire manufacturing.

5 Claims, No Drawings

RUBBER COMPOSITION COMPRISING SURFACE-TREATED CARBON BLACK

FIELD OF THE INVENTION

The present invention relates to the manufacture of improved rubbery products for general use in rubber products of all kinds such as pneumatic tires, conveyer belts and hoses.

The primary use for the products of invention is in pneumatic tires for all types of land, and air vehicles.

More particularly, the invention relates to preparing a rubber composition having an improved reinforcement property and at the same time an improved mixing workability of the rubber composition.

BACKGROUND OF THE INVENTION

It is commonly known that carbon black is used in order to increase the reinforcement of a rubber composition.

Recently, the level of quality of carbon black has been higher, and carbon black having a larger specific surface area is used to improve the reinforcing property such as wear resistance.

That is, the use of carbon black having a specific surface area of more than 130 m$^2$/g as measured by the nitrogen adsorption method (N$_2$SA) is more and more increased. It is necessary to disperse the carbon black homogeneously in a rubber matrix to achieve a sufficient effect of reinforcement due to its own property.

However, it is difficult to disperse it homogeneously because of strong adhesion between carbon black particles. As a result, the reinforcement effect of the carbon black having a large surface area is deteriorated.

Further, in this case much energy is needed to disperse the carbon black homogeneously. This degrades the efficiency of productivity in tire manufacturing. In addition, the viscosity of the rubber composition increase extremely and this phenomenon also lowers the efficiency of the productivity of the tires remarkably.

In order to satisfy the above described demands, improvement in the properties of rubber compositions has been attempted by treating the surface of the carbon black.

Japanese Patent Publication No. 5643/1970, No. 24462/1983 and No. 30417/1968 disclose carbon black which is treated with oily substances or high molecular substances so as to lower the cohesive energy between carbon black particles.

However, in such methods the effect of the dispersibility of carbon black having a N$_2$SA of more than 130 m$^2$/g is still poor.

That is, when the carbon black, especially having a N$_2$SA of more than 130 m$^2$/g is mixed with rubber, a layer, called a gel, is easily generated.

It is believed that the carbon gel is generated at the surface of the carbon black in the beginning of the mixing of the particles of carbon black and thereby lowers the dispersibility of the carbon black.

Further, it is known that the resulting rubber compound has an increased viscosity which make the kneading workability difficult. This phenomenon is much more remarkable when using carbon black having a N$_2$SA more than 130 m$^2$/g.

The inventors have made various investigations with respect to carbon black in a rubber composition used in tires and other rubber articles, and found out that when carbon black having a large specific surface is treated with a specific amine or quinoline compound, both the reinforcement property and the processing of the rubber composition is improved.

SUMMARY OF THE INVENTION

An object of this invention is to achieve improved properties of carbon black.

Another object of this invention is to achieve improved reinforcement properties of a rubber composition by improving the dispersibility of carbon black in the rubber matrix without lowering the reinforcement.

A further object is to lower the viscosity of the rubber matrix filled with the carbon black having a large specific surface area and increase the productivity of the tire manufacture.

This invention provides a novel rubber composition which comprises a rubber composition comprising 100 parts by weight of at least one of natural rubber and synthetic rubber and 30–140 parts by weight of carbon black, said carbon black having a specific surface area (N$_2$SA) of more than 130 m$^2$/g as measured by the nitrogen adsorption method, and the surface of said carbon black being treated with about 0.5–5.0 parts by weight of at least one compound selected from the group consisting of an amine compound and a quinoline compound based on 100 parts by weight of said carbon black.

DETAILED DESCRIPTION OF THE INVENTION

Amine compounds used in this invention may be naphthylamine derivative, diphenylamine derivative, p-phenylenediamine derivative and other amine compound and the mixtures thereof.

(1) Examples of suitable naphthylamine derivative which can be used are N-phenyl-1-naphthylamine, N-phenyl-2-naphthylamine, N-(3'-hydroxybutylidene)-1-naphthylamine, reaction product of N-phenyl-2-naphthylamine and acetone (Trade Name; Antigene DA made by Sumitomo Chemical K.K.), and reaction product at low temperature of N-phenyl-2-naphthylamine and acetone (Trade Name; Betanox Special made by Uniroyal Chemical Co. U.S.A.).

(2) Examples of suitable diphenylamine derivative which can be used are p-isopropoxy.diphenylamine, bis(phenyl.iso-propylidene)-4,4'-diphenylamine, p,p'-toluene.sulfonylamino-diphenylamine, 4,4'-($\alpha,\alpha$-dimethyl.benzyl)-diphenylamine, mixture of di-aryl-p-phenylenediamine (Trade Name; Nonflex TP made by Seiko Chemical K.K.), N,N'-diphenyl.ethylenediamine, N,N'-diphenyl.propylenediamine, reaction product at high temperature of diphenylamine and acetone (Trade Name; Noclac B made by Ouchi Chemical Industry K.K.), reaction product at low temperature of diphenylamine and acetone (Trade Name; Aminox made by Uniroyal Chemical Co. U.S.A.), reaction product at low temperature of diphenylamine-aniline and acetone (Trade Name; Nonflex BAR made by Seiko Chemical K.K.), reaction product of diphenylamine and diisobutylene (Octamine made by Uniroyal Chemical Co.), octylated diphenylamine (Trade Name; Noclac AD made by Ouchi Shinko Chemical Industry, Trade Name; Antioxidant OCD made by Bayer Co. West Germany, Trade Name; Flectol ODP made by Monsanto Co. U.S.A.), nonylated diphenylamine (Trade Name; Polylite made by Uniroyal Chemical Co. U.S.A.), displaced diphenylamine (Trade name; Antioxidant 445 made by Uniroyal Chemical Co. U.S.A.), alkylated diphenylamine (Trade Name; Noclac ODA made by Ouchi Chemical Industry K.K., Trade name; Antioxidant AD made by Anker Chemical Co.), mixture of alkylated diphenylamine (Trade Name; AgeRite Stalite, AgeRite Stalite S, AgeRite Nepa made by Vanderbilt Co. U.S.A.), blend of the mixture of diphenylamine and petroleum wax (Trade Name; AgeRite Gel made by Vanderbilt Co. U.S.A.) and derivatives of diphenylamine (Trade Name; Antage OD, Antage LDA made by Kawaguchi Chemical Co., Trade Name; Antioxidant DDA made by Bayer Co. West Germany).

(3) Examples of suitable p-phenylenediamine derivative which can be used are N,N'-diphenyl-p-phenylenediamine, N,N'-di-2-naphthyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N,N'-diaryl-p-phenylenediamine, N-isopropyl-N'-phenyl-p-phenylenediamine, N-cyclohexyl-N'-phenyl-p-phenylenediamine, N-alkyl-N'-phenyl-p-phenylenediamine, N-alkyl-N'-aryl-p-phenylenediamine, N-4-methyl-2-pentyl-N'-phenyl-p-phenylenediamine, N-(1,3-dimethylbutyl)-N'-phenyl-p-phenylenediamine, N-(1-methylheptyl)-N'-phenyl-p-phenylenediamine, N-phenyl-N'-(3-methacryloyloxy-2-hydroxypropyl)-p-phenylenediamine, hindered.diaryl-p-phenylenediamine, phenylhexyl-p-phenylenediamine, phenyloctyl-p-phenylenediamine and mixture of diaryl-p-phenylenediamine (Trade Name; Antage ST-1 made by Kawaguchi Chemical K.K., Trade name; Noclac 630 and Noclac 660 made by Ouchi Shinko K.K.).

(4) Examples of suitableother amine compounds which can be used are N,N'-di-o-toryl.ethylenediamine, N,N'-disarylcilidene-1,2-propanediamine, reaction product of amine and ketone (Trade Name; Antigene FR, Antigene AS made by Sumitomo Chemical K.K.), derivatives of aromatic amines (Trade Name; Anti-Aging ADD made by A.C.N.A. Italy) and condensation product of butylaldehyde and aniline (Trade Name; Antox Special made by Du Pont Co. U.S.A.).

Further, examples of suitable quinoline compounds which can be used are polymerization product of 2,2,4-trimethyl-1,2-dihydroquinoline, 6-ethoxy-2,2,4-trimethyl-1,2-dihydroquinoline, 6-dodecyl-2,2,4-trimethyl-1,2-dihydroquinoline and derivatives of trimethyl.dihydroquinoline (Trade Name; Antigene MW made by Sumitomo Chemical Industry K.K.).

Next, as the method of treating the surface of carbon black, an organic solution or liquid dispersed in water which contains the above mentioned amine or quinoline compound is poured into the carbon black in a wet-type pelletizer of carbon black. Then, the carbon black particles produced by the above method are dried at from 105° C. to 200° C. to evaporate the solvent or water.

It is necessary to incorporate from about 0.5 to about 5.0 parts by weight of amine and/or quinoline compound relative to 100 parts by weight of the carbon black. When the compound is present in amount of less than about 0.5 parts by weight, no increase in reinforcement effect due to the carbon black is obtained and also the effect of the improvement of processing cannot be obtained.

When it is present in an amount of more than about 5.0 parts by weight the effect of the improvement of processing is obtained, but the reinforcement such as wear resistance is lowered.

The rubbers in this invention may contain natural rubber and/or synthetic diene rubbers.

In this invention, suitable synthetic diene rubbers which can be used include synthetic polyisoprene rubber, polybutadiene rubber, styrene-butadiene rubber, ethylene-propylene-diene terpolymer rubber, isobutylene-isoprene rubber, halogenated isobutylene-isoprene rubber and a blend thereof.

It is preferred to incorporate about 30 to about 140 parts by weight of carbon black relative to 100 parts by weight of the rubber in this invention.

When the carbon black is present in an amount of less than about 30 parts by weight, effective reinforcement of the rubber composition is not achieved. When it is present in an amount of more than 140 parts by weight, the vulcanized rubber composition has a high hysteresis loss.

The rubber composition of the present invention may contain a vulcanizer, such as sulfur or the like, vulcanization accelerator, accelerator activator, antioxidant, softener, filler and the like in addition to the carbon black.

The following examples are given for the purpose of further illustration of this invention. They are not to be construed, however, as limiting the scope of this invention. Unless otherwise indicated herein, all parts are by weight.

EXAMPLES

The compounding recipes of rubber compositions used in example and comparative example are follows:

|  | parts by weight |
|---|---|
| Natural rubber (RSS #1) | 100.0 |
| Carbon black | 45.0 |
| Stearic acid | 3.0 |
| Zinc Oxide | 4.0 |
| Antioxidant (*1) | 1.0 |
| Accelerator (*2) | 1.0 |
| Sulfur | 1.5 |

(*1) N—phenyl-N'—isopropyl-p-phenylenediamine
(*2) N—oxydiethylene-2-benzothiazole sulfeneamide The characteristics of the carbon black and rubber composition were evaluated by the following ways:
(1) Specific surface area as measured by the nitrogen method ($N_2SA$ method) ($m^2/g$)
  ASTM D-3037
(2) Dispersing degree of the carbon black
  ASTM D-2663
(3) Mooney viscosity
  JIS K6300-1974
(4) Wear resistance test
  Wear loss of rubber sample which was vulcanized at 145° C. for 30 minutes measured by means of a Lambourn abrasion tester and wear resistance index was calculated by the following formula:

$$\text{index} = \frac{\text{loss volume of IRB\#5 test piece (standard sample)}}{\text{loss volume of sample piece}}$$

Hereto, IRB#5 means Industry Reference Black #5 defined by ASTM D-1765.
The larger index value, the better the wear resistance.
(1) In Comparative Example 1-2, the usual untreated carbon black having a $N_2SA$ of 160 $m^2/g$ and 125 $m^2/g$ respectively was used.

(2) In Example 1-3 and Comparative Example 3-4, the comparison of an amount of added compound is shown. The compound A used in this case is N-(1-methylheptyl)-N'-phenyl-p-phenylenediamine (Trade Name: Ozonon 35 made by Seiko Chemical K.K.)

(3) In Example 4-6 and Comparative Example 5, four kinds of the carbon blacks having various amount of $N_2SA$ are used. Added compound is the same as that of compound A in Example 1-3.

(4) In Example 7-15, the carbon black was treated with various kinds of compounds.

The compounds used in Example 7-15 are follows respectively:

EXAMPLE 7

Compound B

N-phenyl-N'-isopropyl-p-phenylenediamine (Trade Name: Noclac 810NA made by Ouchi Shinko Chemical Industry K.K.)

EXAMPLE 8

Compound C

N-(1,3-dimethylbutyl)-N'-phenyl-p-phenylenediamine (Trade Name: Ozonon 6C made by Seiko Chemical K.K.).

EXAMPLE 9

Compound D

N-phenyl-N'-(3-methacryloyloxy-2-hydroxypropyl)-p-phenylenediamine (Trade Name: Noclac G1 made by Ouchi Shinko Chemical Industry K.K.)

EXAMPLE 10

Compound E p,p'-toluenesulfonylamino-diphenylamine (Trade Name: Noclac TD made by Ouchi Shinko Chemical Industry K.K.)

EXAMPLE 11

Compound F

N,N'-diphenyl-p-phenylenediamine (Trade Name: Noclac DP made by Ouchi Shinko Chemical Industry K.K.)

EXAMPLE 12

Compound G

N-phenyl-1-naphthylamine (Trade Name: Noclac PA made by Ouchi Shinko Chemical Industry K.K.)

EXAMPLE 13

Compound H octylated diphenylamine (Trade Name: Noclac AD made by Ouchi Shinko Chemical Industry K.K.)

EXAMPLE 14

Compound J 6-ethoxy-2,2,4-trimethyl-1,2-dihydroquinoline (Trade Name: Noclac AW made by Ouchi Shinko Chemical Industry K.K.)

EXAMPLE 15

Compound K reaction product of amine and ketone (Trade Name: Antigene FR made by Sumitomo Chemical Industry K.K.)

TABLE 1

| Treatments and Results | Comparative Ex. ample 1 | Comparative Example 2 | Comparative Ex. ample 3 | Example 1 | Example 2 | Example 3 | Comparative Example 4 | Comparative Example 5 | Example 4 | Example 5 |
|---|---|---|---|---|---|---|---|---|---|---|
| $N_2SA$ (m²/g) | 160 | 125 | 160 | 160 | 160 | 160 | 160 | 125 | 140 | 160 |
| Added Compound | (A) | (A) | (A) | (A) | (A) | (A) | (A) | (A) | (A) | (A) |
| Amounts of the added compound*¹ | 0 | 0 | 0.2 | 0.5 | 1.5 | 5.0 | 7.5 | 2.0 | 2.0 | 2.0 |
| Results | | | | | | | | | | |
| Dispersing degree of the carbon black | 62 | 93 | 61 | 83 | 87 | 91 | 93 | 95 | 92 | 90 |
| Mooney Viscosity*² | 101 | 88 | 105 | 95 | 92 | 88 | 85 | 80 | 88 | 90 |
| Wear resistance, index | 126 | 119 | 125 | 131 | 135 | 144 | 124 | 119 | 128 | 138 |

| Treatments and Results | Example 6 | Example 7 | Example 8 | Example 9 | Example 10 | Example 11 | Example 12 | Example 13 | Example 14 | Example 15 |
|---|---|---|---|---|---|---|---|---|---|---|
| $N_2SA$ (m²/g) | 200 | 160 | 160 | 160 | 160 | 160 | 160 | 160 | 200 | 160 |
| Added Compound | (A) | (B) | (C) | (D) | (E) | (F) | (G) | (H) | (J) | (K) |
| Amounts of the added compound*¹ | 2.0 | 2.0 | 2.0 | 2.0 | 2.0 | 2.0 | 2.0 | 2.0 | 2.0 | 2.0 |
| Results | | | | | | | | | | |
| Dispersing degree of the carbon black | 85 | 92 | 90 | 93 | 89 | 88 | 89 | 92 | 91 | 88 |
| Mooney Viscosity*² | 100 | 92 | 95 | 90 | 91 | 93 | 90 | 92 | 96 | 94 |
| Wear resistance, index | 156 | 135 | 132 | 137 | 134 | 133 | 133 | 140 | 137 | 144 |

*¹Parts by weight based on 100 parts by weight of the carbon black
*²Minimum torque in the Mooney scorch test measured by JIS K6300-1974.

The results in Table 1 above show the following:

(1) From Example 1-3 and Comparative Example 1, it is clear that the rubber compositions of this invention are preferred with respect to the dispersion of carbon black and thereby provides not only improved reinforcement (Wear resistance) but also improved processing (Mooney viscosity) of the rubber composition due to the remarkably lower viscosity.

(2) From Example 1–3 and Comparative Example 3–4, it is clear that the effect of the invention is shown by the use of the treating compound of 0.5 to 5.0 parts by weight based on 100 parts by weight of carbon black.

(3) From Example 4–6 and Comparative Example 1, 2, 5, it is clear that the effect of treating with a particular compound can be first obtained by the use of the carbon black having a specific surface area of more than 130 m$^2$/g.

(4) From Example 7–15 and Comparative Example 1, it is clear that the compounds used in the treatment with the surface of the carbon black by this invention are all very useful.

(Effects of the present invention)

As have been described in the above, the rubber composition according to the present invention provides the improved dispersion of carbon black in the rubber matrix without lowering the reinforcement and therefore a rubber composition having excellent property can be obtained exhibiting a sufficient reinforcement property due to the carbon black having the large specific surface area.

Moreover, in this invention the viscosity of rubber matrix filled with carbon black having a large specific area is lowered and thereby the efficiency of producing the tires is improved. Therefore, this invention shows extremely large effects in the improvement of the property of the rubber compositions and at the same time the improvement of the efficiency of productivity in tire manufacturing.

What is claimed is:

1. A rubber composition for pneumatic tires comprising:
   (A) 100 parts by weight of at least one member selected from the group consisting of natural rubber and synthetic diene rubber, and
   (B) 30–140 parts by weight of carbon black, wherein said carbon black has a specific surface area of more than 130 m$^2$/g as measured by the nitrogen adsorption method, and wherein the surface of said carbon black is treated with about 0.5 to about 5.0 parts by weight of at least one compound selected from the group consisting of an amine compound and a quinoline compound based on 100 parts by weight of said carbon black, wherein the amine compound is at least one compound selected from the group consisting of a naphthylamine derivative, the reaction product of an amine and a ketone, p-isopropoxy.diphenylamine, bis(phenyl.isopropylidene)-4,4'diphenylamine, p,p'-toluene.sulfonylamino-diphenylamine, 4,4'-($\alpha,\alpha$-dimethyl.-benzyl)diphenylamine, a mixture of di-aryl-p-phenylenediamine, N,N'-diphenyl.ethylenediamine, N,N'-diphenyl.propylenediamine, the reaction product of diphenylamine and diisobutylene, octylated diphenylamine, nonylated diphenylamine, displaced diphenylamine, a mixture of alkylated diphenylamine, a blend of a mixture of diphenylamine and petroleum wax, N,N'-diphenyl-p-phenylenediamine, N,N'-di-2-naphthyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N,N'-diaryl-p-phenylenediamine, N-isopropyl-N'-phenyl-p-phenylenediamine, N-cyclohexyl-N'-phenyl-p-phenylenediamine, N-alkyl-N'-phenyl-p-phenylenediamine, N-alkyl-N'-aryl-p-phenylenediamine, N-4-methyl-2-pentyl-N'-phenyl-p-phenylenediamine, N-(1,3-dimethylbutyl)-N'-phenyl-p-phenylenediamine, N-(1-methylheptyl)-N'-phenyl-p-phenylenediamine, N-phenyl-N'-(3-methacryloyloxy-2-hydroxypropyl)-p-phenylenediamine, hindered.diaryl-p-phenylenediamine, phenylhexyl-p-phenylenediamine and phenyloctyl-p-phenylenediamine.

2. The composition of claim 1, wherein the quinoline compound is dihydroxy-quinoline derivative.

3. The composition of claim 1, wherein the amine compound is at least one compound selected from the group consisting of N-isopropyl-N'-phenyl-p-phenylenediamine, N-(1,3-dimethylbutyl)-N'-phenyl-p-phenylenediamine, N-phenyl-N'-(3-methacryloyloxy-2-hydroxypropyl)-p-phenylenediamine and N-N'-diphenyl-p-phenylenediamine.

4. The composition of claim 1, wherein the synthetic diene rubber is at least one rubber selected from the group consisting of synthetic polyisoprene rubber, polybutadiene rubber, styrene-butadiene rubber, ethylene-propylene terpolymer rubber, isobutylene-isoprene rubber, and halogenated isobutylene-isoprene rubber.

5. The composition of claim 1, wherein the reaction product of an amine and a ketone is the reaction product at high temperature of diphenylamine and acetone, the reaction product at low temperature of diphenylamine and acetone or the reaction product at low temperatue of diphenylamine-aniline and acetone.

* * * * *